US 6,612,259 B2

(12) United States Patent
Yoshida et al.

(10) Patent No.: US 6,612,259 B2
(45) Date of Patent: Sep. 2, 2003

(54) OXYGEN GENERATING MATERIALS, CARBON DIOXIDE ABSORBING MATERIALS, AND TRANSPORT SYSTEM AND TRANSPORT METHOD OF LIVE FISHERY PRODUCTS

(75) Inventors: Kiyoshi Yoshida, Yokkaichi (JP); Yasuo Hiro, Yokkaichi (JP); Jun Kokubo, Yokkaichi (JP); Chiharu Nishizawa, Yokkaichi (JP); Susumu Watanabe, Yokkaichi (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/922,714

(22) Filed: Aug. 7, 2001

(65) Prior Publication Data

US 2002/0001548 A1 Jan. 3, 2002

Related U.S. Application Data

(62) Division of application No. 09/160,328, filed on Sep. 25, 1998, now Pat. No. 6,306,352.

(30) Foreign Application Priority Data

Sep. 26, 1997 (JP) .............................................. 9-261607
Dec. 9, 1997 (JP) .............................................. 9-338732
Jan. 29, 1998 (JP) .............................................. 10-16946

(51) Int. Cl.[7] .............................................. A01K 63/02

(52) U.S. Cl. ....................... 119/203; 119/201; 119/214; 119/231; 119/230

(58) Field of Search ................................. 119/201, 203, 119/214, 231, 230, 1, 3, 120, 183.11; 43/54.1

(56) References Cited

U.S. PATENT DOCUMENTS 3,565,041 A * 2/1971 Brooka ........................... 119/3
3,593,711 A 7/1971 Staub
3,604,416 A 9/1971 Petrahai et al.

(List continued on next page.)

FOREIGN PATENT DOCUMENTS

GB 2245809 A * 1/1992 .......... A01K/63/04
JP 362278104 A * 12/1987 .......... C01B/13/02
JP 4363285102 A * 11/1988 .......... C01B/13/02

(List continued on next page.)

*Primary Examiner*—Peter M Poon
*Assistant Examiner*—Andrea M. Valenti
(74) *Attorney, Agent, or Firm*—Nixon Peabody LLP; Thomas W. Cole

(57) ABSTRACT

The present invention provides an effective oxygen generating materials, carbon dioxide absorbing materials, and transport system and transport method of live fishery products for use upon transporting live fishery products. An oxygen generating materials of the present invention is prepared by packaging solid peroxide and peroxide decomposition catalyst with a moisture-permeable material having a cup method moisture permeability (40° C., 90% RH) of more than 20 $g/m^2/24$ hr and being impervious to water at normal pressure. Furthermore, a carbon dioxide absorbing materials are prepared by packaging alkaline earth metal hydroxide and/or oxide with a gas-permeable material having a Gurley method gas permeability (JIS P8117) of 0.1~3000 sec./100 ml of gas and being impervious to water at normal pressure. Moreover, the transport system of live fishery products are a transport system wherein the oxygen generating materials and carbon dioxide absorbing materials pertaining to the present invention are sealed inside a transport bag.

2 Claims, 2 Drawing Sheets

U.S. PATENT DOCUMENTS

| | | | | |
|---|---|---|---|---|
| 3,714,307 A | * | 1/1973 | Shikada | 264/49 |
| 3,728,988 A | * | 4/1973 | Shapero et al. | 119/2 |
| 3,920,803 A | * | 11/1975 | Boryta | 423/579 |
| 4,154,234 A | | 5/1979 | Baker | |
| 4,154,236 A | | 5/1979 | Eckstein et al. | |
| 4,164,218 A | | 8/1979 | Martin | |
| 4,409,978 A | | 10/1983 | Bartos | |
| 4,423,080 A | * | 12/1983 | Bedrosian et al. | 426/124 |
| 4,498,190 A | * | 2/1985 | Garlick, III | 383/28 |
| 4,844,012 A | | 7/1989 | Jerrett | |
| 4,895,729 A | | 1/1990 | Powrie et al. | |
| 4,919,079 A | | 4/1990 | Morishita | |
| 4,926,795 A | * | 5/1990 | Hamilton et al. | 119/3 |
| 4,962,728 A | * | 10/1990 | Highfill | 119/3 |
| 4,963,327 A | | 10/1990 | Russell | |
| 5,029,578 A | | 7/1991 | Swiatosz | |
| 5,050,535 A | * | 9/1991 | McKellar et al. | 119/3 |
| 5,159,895 A | * | 11/1992 | Helling et al. | 119/3 |
| 5,182,054 A | * | 1/1993 | Bauer et al. | 264/15 |
| 5,186,165 A | | 2/1993 | Swann | |
| 5,463,983 A | | 11/1995 | Nagaura | |
| 5,492,741 A | * | 2/1996 | Akao et al. | 428/35.2 |
| 6,117,457 A | * | 9/2000 | Devos et al. | 424/616 |
| 6,306,352 B1 | * | 10/2001 | Yoshida et al. | 422/120 |
| 6,354,246 B1 | * | 3/2002 | Kamihata et al. | 119/496 |

FOREIGN PATENT DOCUMENTS

| | | | | |
|---|---|---|---|---|
| JP | 01103902 A | * | 4/1989 | C01B/13/02 |
| JP | 403108428 A | * | 5/1991 | A01K/61/00 |
| JP | 403157136 A | * | 7/1991 | B01J/20/28 |
| JP | 4-29840 | | 1/1992 | |
| JP | 404075546 A | * | 3/1992 | A01K/63/04 |
| JP | 4-26808 | | 5/1992 | |
| JP | 404267828 A | * | 9/1992 | A01K/63/02 |
| JP | 05306104 | * | 11/1993 | C01B/13/02 |
| JP | 07289114 A | * | 11/1995 | A01K/63/02 |

* cited by examiner

OXYGEN GENERATING MATERIALS, CARBON DIOXIDE ABSORBING MATERIALS, AND TRANSPORT SYSTEM AND TRANSPORT METHOD OF LIVE FISHERY PRODUCTS

This is a divisional of application Ser. No. 09/160,328, filed Sep. 25, 1998 now U.S. Pat. No. 6,306,352.

BACKGROUND OF THE INVENTION

1. Field of the Invention

The present invention relates to an oxygen generating materials, carbon dioxide absorbing materials, and transport system and transport method of live fishery products for preventing vitality deterioration and death of live fishery products.

2. Description of the Related Art

Methods of transporting live fishery products while keeping the likes of edible natural fish, cultivated fish, shellfish or aquarium fish alive can be divided broadly into transport without using water (which will be referred to as "waterless transport"), transport using tank (which will be referred to as "tank transport"), and transport using plastic film bag (which will be referred to as "plastic transport").

Waterless transport is a method wherein fish are transported without using water while being exposed to air, and is used for carp, crucian carp, loaches, prawns and the like. Since it is easy for the fish to fall into a condition of hypoxia, waterless transport can only be used for transports of short periods of time.

Tank transport is a transport method wherein oxygen is supplied from the oxygen cylinder to the water tank installed on a truck while letting the fish swim therein, and is used for transports in large amounts and relatively long distances. However, as this method requires costly specialized equipment, there is a problem in that the usage thereof is limited since transportation expenses become costly.

Furthermore, Japanese Patent Laid-Open Publication No. Hei 4(1992)-26808 proposes a transport method wherein fish, water and oxygen are placed in a receptacle equipped with an air pump and carbon dioxide absorbing tank on the outside while circulating air therein. However, as this method also requires costly specialized equipment, there is a problem in that the usage thereof is limited since transportation expenses become costly.

Plastic transport is a transport method wherein water and live fishery products are placed in a plastic film bag, sealed hermetically while leaving headspace, and further placed in a corrugated cardboard box or the like, and is used for small-scale and short-time transports. Plastic transport is an easy and low-costing method, and is widely used for transporting various kinds of cultivated fish, natural fish and aquarium fish. However, with the plastic transport method, water temperature during transportation, concentration of dissolved oxygen and water quality cannot be controlled, thereby leaving a problem in that, even within a 24-hour transport, vitality deterioration and death of fish during transport are likely to occur.

Therefore, with plastic transport, various ideas such as lowering the temperature of water that is hermetically sealed together with the fish, filling the headspace with gaseous oxygen, and ceasing the provision of feed have been employed in order to prevent vitality deterioration and death of fish during transport.

However, the employment of these methods is still usually insufficient in preventing vitality deterioration and death of live fishery products during the transport thereof. Particularly during the summer season when the temperature rises, vitality deterioration and death of fish occur, thereby leaving a problem in that the product value of such live fishery products being significantly reduced. With respect to edible fish, the price of dead fish is reduced to less than half of that of live fish. This is even a more serious problem concerning aquarium fish, whereby an aquarium fish that dies during transport becomes valueless. Furthermore, even if the fish loses vitality or a single fish inside the transport bag is to die, there is a problem in that the product value will be significantly reduced.

Particularly, transports to distant places requiring 24 hours or more is extremely difficult with conventional plastic transport technology as vitality deterioration and death of fish are likely to occur.

Moreover, as oxygen generating materials to be used for the transport or the like of live fishery products, a type wherein an aqueous solution of peroxide and a decomposition agent thereof are packaged with a multi-layered package (Patent Laid-Open Publication No. Hei 1(1989)-103902), a type wherein peroxide and the like are covered with a water-permeable sheet including a layer of active carbon (Patent Laid-Open Publication No. Hei 5(1993)-306104), and a type wherein a composition of hydrogen peroxide adduct and the like and a solidifying agent are packaged (Patent Laid-Open Publication Hei 7(1995)-289114) and so on have been proposed. However, a type which fulfills all such conditions as no elution of composition components into the water upon usage, easy operation, steady generation of oxygen for a long period of time, low manufacturing cost, and outstanding preservation stability has not been provided heretofore.

SUMMARY OF THE INVENTION

The present invention aims at solving the aforementioned conventional problems and an object thereof is to provide a low costing oxygen generating materials and carbon dioxide absorbing materials without requiring special equipment or machinery and having a simple structure with the operation being easy, wherein the oxygen absorbing materials are capable of generating oxygen for a long period of time in a safe and steady manner.

Another object of the present invention is to provide a transport system and transport method of live fishery products utilizing such oxygen generating materials and carbon dioxide absorbing materials.

In order to achieve these objects, upon intense study to solve such problems, the inventors have reached the present invention by discovering that the oxygen generation speed could be controlled by adjusting the amount of moisture to come in contact with a specific oxygen generating materials.

In addition, the inventors have reached the present invention by discovering that the oxygen generation speed and preservation stability could be controlled by adjusting the particle diameter of active carbon in an oxygen generating materials, which is formed by packaging peroxide and active carbon with a water-resistant moisture-permeable material.

Furthermore, the inventors have reached the present invention by discovering that a carbon dioxide absorbing materials, which is formed by packaging alkaline earth metal hydroxide and/or oxide with a plastic gas-permeable material having a Gurley method gas permeability (JIS P8117) of 0.1~3000 sec./100 ml of gas and being impervious to water at normal pressure, efficiently absorbs carbon dioxide and effectively controls the increase of the carbon dioxide concentration.

Moreover, the inventors have reached the present invention by discovering that using an oxygen generating materials and carbon dioxide absorbing materials jointly together within a transport bag prevents vitality deterioration and death of live fishery products and extends the transport time thereof.

Particularly, the present invention provides an oxygen generating materials which is prepared by packaging solid peroxide and peroxide decomposition catalyst with a moisture-permeable material having a cup method moisture permeability (40° C., 90% RH) of more than 20 g/m$^2$/24 hr and being impervious to water at normal pressure.

Peroxide decomposition catalyst may be composed of at least one type selected among manganese dioxide, active carbon, and catalase.

Furthermore, active carbon having a average particle size of 25~5000 μm may be used.

Moisture permeating material may be composed of a multi-micropores film made from a plastic sheet.

Furthermore, moisture permeating material may be composed of a non-woven fabric made from a plastic sheet possessing micropores.

Solid peroxide may be composed of at least one type selected among sodium carbonate hydrogen peroxide adduct, sodium perborate mono-hydrate, and sodium perborate tetra-hydrate.

The weight ratio of solid peroxide and peroxide decomposition catalyst may be 100:0.01~100:100.

Moreover, the present invention comprises alkaline earth metal hydroxide and/or oxide and a gas-permeable material having a Gurley method gas permeability (JIS P8117) of 0.1~3000 sec./100 ml of gas and being impervious to water at normal pressure, and provides a carbon dioxide absorbing materials which is prepared by packaging alkaline earth metal hydroxide and/or oxide with a plastic gas-permeable material.

Alkaline earth metal hydroxide and/or oxide may be selected among calcium hydroxide, magnesium hydroxide, calcium oxide, and magnesium oxide.

Gas permeable material may be a plastic microporous film.

Furthermore, gas-permeable material may be a plastic non-woven fabric.

Furthermore, the present invention provides an oxygen generating materials/carbon dioxide absorbing materials package that is prepared by packaging an oxygen generating materials and carbon dioxide absorbing materials with a packaging material which permeates water at normal pressure. This packaging material which permeates water at normal pressure may be composed of hydrophobic non-woven fabric.

Furthermore, in the present invention, it is possible to add a desiccant to the oxygen generating materials and carbon dioxide absorbing materials. Although there is no particular limitation regarding the type of desiccant to be placed within the oxygen generating materials package, upon considering the performance and convenience in handling the same, it is preferable to use at least one type selected among silica gel, activated alumina, and zeolite. Although it may differ according to the type and water content percentage of solid peroxide and catalyst, type of desiccant, moisture permeability and preservation condition of the packaging material, the most preferable weight ratio of solid peroxide and the desiccant is within the range of, generally speaking, 100:0.1~100:100. By providing a desiccant within the oxygen generating materials package, the moisture concentration within the package is preserved low, stability of peroxide upon preservation is increased, and collapse of loads caused by inflation of the preservative outer bag is prevented.

As desiccants to place within the carbon dioxide absorbing materials package, the same desiccants used in the oxygen generating materials package may be utilized. By providing a desiccant within the carbon dioxide absorbing materials package, the moisture concentration within the package is preserved low, and the stability of alkaline earth metal hydroxide upon preservation is increased.

It is preferable that this oxygen generating materials/carbon dioxide absorbing materials package with the added desiccant be preserved within an outer bag made from non moisture-permeable material having a cup method moisture permeability (40° C., 90% RH) of less than 20 g/m$^2$/24 hr. As non moisture-permeable material, it is possible to use the likes of aluminum foil, aluminum evaporation film, silica evaporation film, polyvinylalcohol film, non-permeable nylon film, and polyvinylidene chloride coated film.

Making the outer bag made from non moisture-permeable material a hermetically sealed bag is preferable in that seepage of moisture from the outside may be restrained and thereby displaying significant advantages of the desiccant within the oxygen generating materials. Moreover, in order to avoid the inflation of the outer bag when oxygen is generated upon a portion of peroxide being decomposed, it is preferable that a pinhole be provided on the outer bag. In such case, in order to absorb the small amounts of moisture seeping through such pinhole from the outside, a desiccant may further coexist within the outer bag.

Furthermore, the present invention provides a transport system of live fishery products wherein an oxygen generating materials and carbon dioxide absorbing materials are sealed inside a transport bag.

The oxygen generating materials may be prepared by packaging solid peroxide and peroxide decomposition catalyst with a moisture-permeable material having a cup method moisture permeability (40° C., 90% RH) of more than 20 g/m$^2$/24 hr and being impervious to water at normal pressure.

The carbon dioxide absorbing materials may be prepared by packaging alkaline earth metal hydroxide and/or oxide with a plastic gas-permeable material having a Gurley method gas permeability of 0.1~3000 sec./100 ml of gas and being impervious to water at normal pressure.

Furthermore, solid peroxide may be composed of at least one type selected among sodium carbonate hydrogen peroxide adduct, sodium perborate mono-hydrate, and sodium perborate tetra-hydrate.

Furthermore, peroxide decomposition catalyst may be composed of at least one type selected among manganese dioxide, active carbon, and catalase.

Furthermore, alkaline earth metal hydroxide and/or oxide may be selected among calcium hydroxide, magnesium hydroxide, calcium oxide, and magnesium oxide.

Furthermore, the present invention provides a transport system of live fishery products wherein an oxygen generating materials according to the present invention is sealed inside a transport bag.

Furthermore, the present invention provides a transport system of live fishery products wherein a carbon dioxide absorbing materials according to the present invention is sealed inside a transport bag.

Furthermore, the present invention provides a transport system of live fishery products wherein an oxygen generating materials are sealed inside a transport bag containing live fishery products and liquid for such live fishery products to be kept alive.

Furthermore, the present invention provides a transport system of live fishery products wherein a carbon dioxide absorbing materials are sealed inside a transport bag containing live fishery products and liquid for such live fishery products to be kept alive.

Furthermore, the present invention provides a transport system of live fishery products wherein an oxygen generating materials and carbon dioxide absorbing materials are sealed inside a transport bag containing live fishery products and liquid for such live fishery products to be kept alive.

DESCRIPTION OF THE PREFERRED EMBODIMENTS (Embodiment 1)

Figure 1:
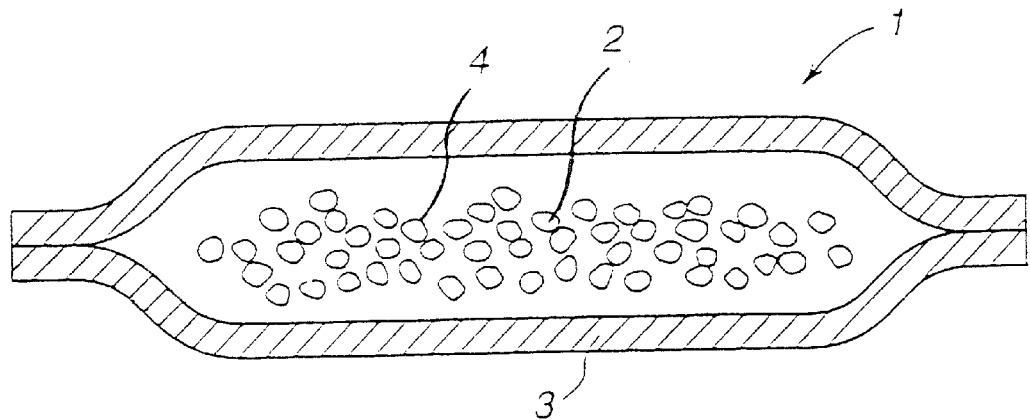
FIG. 1 is a sectional view of an oxygen generating materials pertaining to Embodiment 1 of the present invention.

An oxygen generating materials 1 pertaining to Embodiment 1 comprises, as shown in FIG. 1, a structure wherein solid peroxide 2 and peroxide decomposition catalyst 4 are packaged with a moisture-permeable material 3. This moisture-permeable material 3 is characterized in that the cup method moisture permeability at 40° C., 90% RH is more than 20 g/m$^2$/24 hr, and that it is impervious to water at normal pressure.

Figure 2:
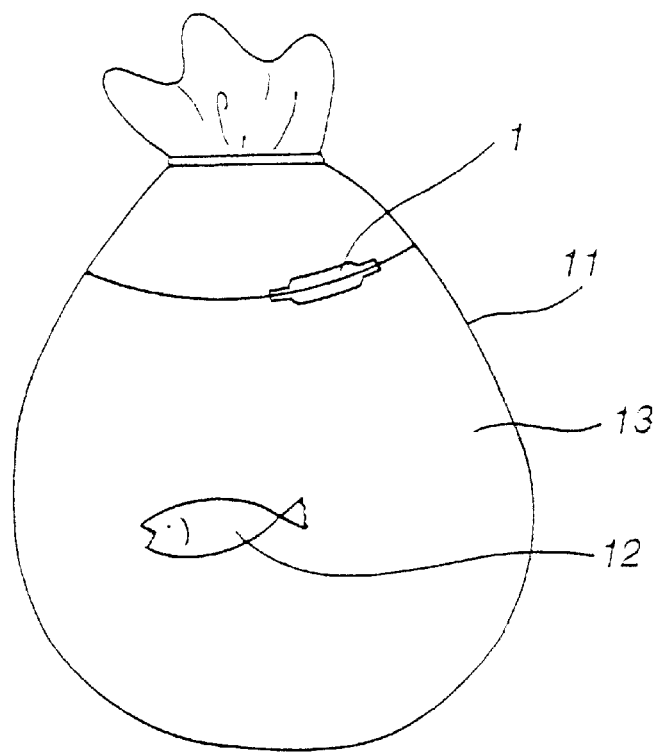
FIG. 2 is a perspective view of a transport system of live fishery products pertaining to Embodiment 1 of the present invention.

Furthermore, the transport system of live fishery products pertaining to Embodiment 1 comprises, as shown in FIG. 2, a structure wherein this oxygen generating materials 1 is sealed inside a plastic film bag 11, which is a transport bag containing live fishery products 12 and water 13.

As solid peroxide of the present invention, inorganic peroxide such as sodium carbonate hydrogen peroxide adduct with sodium carbonate and hydrogen peroxide added thereto at a molar ratio of 2:3, sodium perborate monohydrate, sodium perborate tetra-hydrate, calcium peroxide, barium peroxide, potassium persulfate, potassium hydrogen persulfate, or organic peroxide may otherwise be used. Among the above, upon considering the preservation stability and the like, sodium carbonate hydrogen peroxide adduct, sodium perborate mono-hydrate, and sodium perborate tetra-hydrate are preferable choices. Furthermore, any one of the above may be used individually or in a combination of two or more types.

Particularly regarding sodium carbonate hydrogen peroxide adduct on the market, there exists a variety of grades in which stability and the like are altered by adding or coating various types of salt, etc., and every one of them may be used. Furthermore, as the oxygen generation amount or oxygen generation speed will differ according to the grade used, the proper grade thereof may be used pursuant to the intended duration of oxygen generation or the like.

As peroxide decomposition catalyst, the following may be employed: hydroxide, oxide, chloride, sulfate, acetate, carbonate, phosphate, double salt and oxyacid salt of various metals; multi-microporous absorbing materials such as alumina, active carbon, zeolite and silica gel; enzymes such as catalase; and organic acids such as fumaric acid. Among the above, upon collectively considering the performance of peroxide decomposition and availability, manganese dioxide, active carbon, and catalase are preferable choices. Furthermore, any one of the above may be used individually or in a combination of two or more types.

There is no particular limitation regarding the type of active carbon of the present invention. As a typical example of such goods on the market, there is vegetable active carbon using coconut husk or wood as the raw material, and mineral active carbon using coal or pitch as the raw material. Furthermore, it is also possible to use the likes of catalyst active carbon which particularly improved the efficiency in decomposing hydrogen peroxide (product name: CENTAUR; manufactured by Calgon Far East Co., Ltd.). Furthermore, any one of the above may be used individually or in a combination of two or more types.

Furthermore, the average particle size shall mean, upon obtaining the particle size distribution according to the method of JIS K1474 and preparing a particle size cumulative chart, the size of the sieve perforation when the sieve passing percentage of such chart is 50%.

The average particle size of active carbon used in the present invention is 25~5000 $\mu$m, and preferably 45~1000 $\mu$m. For example, goods on the market limiting the particle diameter may be used, and granular active carbon sold on the market may also be used after being pulverized and sieved.

When the average particle size is more than 25 $\mu$m and less than 5000 $\mu$m, the oxygen generation speed becomes optimum and a desired duration of oxygen generation becomes easier to obtain. Furthermore, it becomes easier to evenly mix solid peroxide and active carbon. The most preferable range of the particle diameter will differ according to the likes of stability of solid peroxide, peroxide decomposition performance of active carbon, moisture permeability of the packaging material, weight ratio of solid peroxide and active carbon, and intended oxygen generation speed.

With the oxygen generating materials of the present invention, if the particle diameter of active carbon is considerably small, there is a tendency of the oxygen generation speed being fast initially, but becoming slower with the lapse of time. On the other hand, if the particle diameter of active carbon is considerably large, there is a tendency of the oxygen generation speed being slow initially, but becoming faster with the lapse of time. Furthermore, by selecting an intermediate particle diameter of the two, the oxygen generation speed may be kept, for the most part, steady from the beginning to the end.

Although the weight ratio of solid peroxide and peroxide decomposition catalyst will differ according to the combination of solid peroxide, peroxide decomposition catalyst and the packaging materials thereof, a preferable range is 100:0.01~100:100. Generally speaking, the larger the ratio of catalyst, the faster the oxygen generation speed and, upon exceeding a certain ratio, the oxygen generation speed does not change.

The packaging material for oxygen generating materials of the present invention is a moisture-permeable material having a cup method moisture permeability (40° C., 90%

RH) of more than 20 g/m$^2$/24 hr, preferably 20~100000 g/m$^2$/24 hr, and being impervious to water at normal pressure. The cup method moisture permeability (40° C., 90% RH) is the moisture permeability measured by JIS Z0208. Furthermore, non gas-permeable film may be used together as a part of such packaging material.

When the ratio of the non moisture-permeable material area of the entire packaging area becomes large, the amount of moisture permeating into the packaging material is increased, thereby increasing the oxygen generation speed. Furthermore, the usage of moisture-permeable material with high permeability will also increase the oxygen generation speed. Therefore, it is desirable that the ratio of moisture-permeable material and the type of moisture-permeable material be selected so as to obtain an appropriate oxygen generation speed. For non gas-permeable portions not using moisture-permeable material, for example, a plastic multi-layered drawn film obtained by dry laminating polyethylene film and polyethylene terephthalate, and non moisture-permeable water-resistant material such as forming receptacles may be used. As a specific example of moisture-permeable material, there are the likes of a multi-microporous film made from a plastic sheet possessing micropores, and a non-woven fabric made from a plastic sheet possessing micropores.

In order to manufacture multi-microporous films which may be used as moisture-permeable material of the present invention, for example, the following methods may be employed: cold drawing synthetic resin films such as polyethylene, polypropylene, and polyethylene fluoride resin; drawing films containing foreign matter; extracting foreign matter from films containing such foreign matter; drawing films after extracting foreign matter from films containing such foreign matter; or performing electron beam irradiation on films. As a multi-microporous film sold on the market which is preferably used in the present invention, for example, there is Juraguard (U.S.A.; manufactured by Celanese Corp.), FP-2 (manufactured by Asahi Chemical Industry Co., Ltd.), NOP (manufactured by Nippon Petrochemical Co., Ltd.), Nitto Flon NTF (manufactured by Nitto Denko Corp.), NF Sheet (manufactured by Tokuyama Corp.), Cellpore NW11 (manufactured by Sekisui Chemical Co., Ltd.), Polyflon Paper (manufactured by Daikin Industries, Ltd.) and so on.

It is preferable that the maximum micropore diameter of the opening of the non-woven fabric, which may be used as the moisture-permeable material of the present invention, is less than 2 μm. Furthermore, as a non-woven fabric for example, various types of plastic fiber, such as polyethylene, polypropylene, polyethylene fluoride, polyester, or nylon, that are conjugated by heat, pressure or adhesives may be used as such non-woven fabric. However, it is preferable to use a non-woven fabric which is made by conjugating long fibers by heat or pressure. As a non-woven fabric sold on the market which is preferably used in the present invention, for example, there is Tyvek (U.S.A.; manufactured by Dupont Inc.), Aiel, Spanbond (manufactured by Asahi Chemical Industry Co., Ltd.), Axtar (manufactured by Toray Industries, Inc.) and so on.

The aforementioned plastic multi-microporous films and non-woven fabrics may be laminated with other materials in order to improve heat sealability and reinforce the strength thereof. As laminating material for improving heat sealability, it is preferable to use a perforated film made from plastic ("porous sheet") possessing a softening point that is lower than the softening point of the multi-microporous film or non-woven fabric. For example, such materials as polyethylene, polypropylene, ethylene vinyl acetate copolymer (EVA), and polyethylene ionomer may be used. Upon using a porous sheet, it is possible to heat fuse the porous sheet to the multi-microporous film or non-woven fabric in advance, or the laminating material and micro-porous film or non-woven fabric may be prepared separately and the periphery thereof may be heat sealed. Furthermore, preferably, this porous sheet is arranged such that it would be on the inner side of the package.

Furthermore, it is preferable to use reinforcing material that is formed by braiding strips of synthetic fibers made from polyethylene. Generally, reinforcing material formed by braiding strips smaller than 10 mm in width into a checkered pattern and heat fusing the vertical strips and horizontal strips is used. In particular, for example, Nisseki Warif (manufactured by Nippon Petrochemical Co., Ltd.) and the like are preferably used. It is preferable that the reinforcing material be heat fused between the porous sheet and multi-porous film or non-woven fabric, and preferable that it is placed in the order of, from the outer side of the package, multi-microporous film or non-woven fabric, reinforcing material, and porous sheet.

There is no particular limitation in the shape or manufacturing method of the oxygen generating materials of the present invention. For example, it is possible to manufacture a package by interposing solid peroxide and peroxide decomposition catalyst between the packaging material, and heat sealing the four sides of such packaging material. With this method, it is preferable to heat seal moisture permeating material with another moisture permeating material, or to heat seal moisture-permeable material with non moisture-permeating water-resistant material.

Furthermore, as packaging material which packages both the oxygen generating materials and carbon dioxide absorbing materials and permeates liquid water at normal pressure, any material which is impervious to solid components of the oxygen generating materials and carbon dioxide absorbing materials but permeates water, oxygen and carbon dioxide may be used, such as woven fabric, non-woven fabric, paper and the like. Among the above, it is preferable to use a hydrophobic moisture-permeable non-woven fabric in consideration of the fact that it does not detract from the performance of the carbon dioxide absorbing materials. Furthermore, from a viewpoint of productivity, it is preferable to use heat sealable material.

Although it will differ according to the combination of the oxygen generating materials, carbon dioxide absorbing materials and packaging materials thereof, or the intended oxygen generation/carbon dioxide absorption duration and the conditions of use, the preferable molar ratio of the theoretical oxygen generation amount and the theoretical carbon dioxide absorption amount of the oxygen generating materials/carbon dioxide absorbing materials package of the present invention is, generally speaking, within the range of 3:1~1:3.

The absorption performance of the carbon dioxide absorbing materials are, generally speaking, stronger with carbon dioxide in the air compared to dissolved carbon dioxide in the water. Therefore, regarding the oxygen generating materials/carbon dioxide absorbing materials package of the present invention, it is preferable to adjust the weight ratio of the oxygen generating materials and carbon dioxide absorbing materials or the number of packages, or to include a "float" made by packaging air as with a hermetically sealed material, such that the package will float.

The oxygen generating materials of the present invention generates oxygen by coming in contact with water or moisture. Although liquid water will not seep into the package even if such package comes in contact with liquid water, oxygen is generated by moisture, which is in an equilibrium state with liquid water, permeating through moisture-permeable material and contacting the oxygen generating agent.

Upon using the oxygen generating materials of the present invention for the transport or preservation of live fishery products, it is preferable to use a hermetically sealed system or a system close to a hermetically sealed system as the generated gaseous oxygen will dissolve easier in the water. For example, a method of placing live fishery products, water, oxygen generating materials of the present invention and, if necessary, gaseous oxygen in a polyethylene bag or the like and fastening the mouth of such bag with a rubber band may be employed. By employing such method, oxygen will be generated continuously for a period of 3 to 5 days within such system, and live fishery products may be kept alive.

If the oxygen generating materials of the present invention is left exposed to the air, there is danger of peroxide being gradually decomposed by the moisture in the air seeping through into the package. Therefore, it is preferable that the oxygen generating materials of the present invention be preserved by hermetically sealing the same with a non moisture-permeable water-resistant material or by coexisting with a desiccant such as silica gel. Particularly, in the event of highly valuing preservation stability, it is preferable to use an oxygen generating materials with a considerably large active carbon particulate diameter.

(Embodiment 2)

Figure 3:
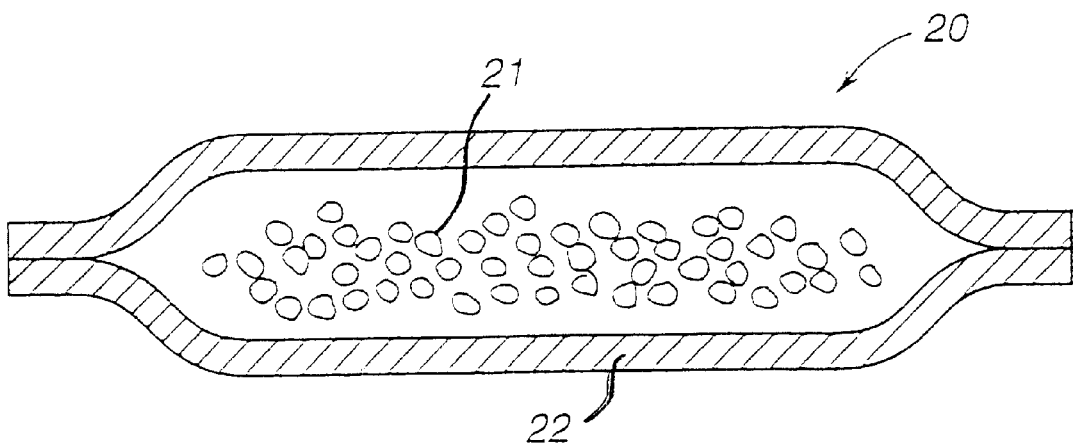
FIG. 3 is a sectional view of a carbon dioxide absorbing materials pertaining to Embodiment 2 of the present invention.

A carbon dioxide absorbing materials 20 pertaining to Embodiment 2 comprises, as shown in FIG. 3, a structure wherein alkaline earth metal hydroxide 21 is packaged with a gas-permeable material 22. This gas-permeable material 22 is characterized in that the Gurley method gas permeability prescribed in JIS P8117 is 0.1~3000 sec./100 ml of gas, and that it is impervious to water but permeates gas at normal pressure.

Furthermore, the transport system of live fishery products pertaining to Embodiment 2 comprises a similar structure as Embodiment 1, wherein this carbon dioxide absorbing materials 20 is sealed inside a plastic film bag which is a transport bag containing live fishery products and water.

Carbon dioxide absorbing materials have heretofore been used for the likes of preserving freshness of vegetables and fruits. As vegetables and fruits gradually generate carbon dioxide which causes the loss of freshness, it was desired for conventional carbon dioxide absorbing materials to absorb large amounts of carbon dioxide. However, it was not necessarily demanded that the absorption speed itself to be fast, and the speed of carbon dioxide absorption of carbon dioxide absorbing materials out on the market are generally not that fast. However, upon comparison with vegetables and fruits, as the amount of carbon dioxide generated per hour in the headspace during the transport of live fishery products is extremely large, it is not possible to promptly absorb the carbon dioxide generated in the headspace with conventional carbon dioxide absorbing materials. A carbon dioxide absorbing materials outstanding in carbon dioxide absorption speed is necessary for the transport of live fishery products.

As carbon dioxide absorbing materials out on the market have preconditions to be used with vegetables and fruits, the aspect of water resistance is not generally provided thereto, and therefore may not be used under conditions of being subject to water. As carbon dioxide absorbing materials to be used for transport of live fishery products are used within a bag containing fish and water, it is necessary to demonstrate the performance of carbon dioxide absorption under severe conditions; such as while preventing water from seeping into the carbon dioxide absorbing materials even when it is subject to water during the transport thereof, and preventing alkaline contents from flowing out into the water. Furthermore, upon considering that the carbon dioxide absorbing materials are sealed inside a bag when filling the same with live fishery products, it is preferable that the carbon dioxide absorbing materials preserves its performance while floating on the water surface without sinking into the water even when it is sealed inside the bag containing live fishery products and water.

The carbon dioxide absorbing materials of the present invention is adequate for the transport of such live fishery products, and displays an outstanding performance of carbon dioxide absorption even when it is used inside a bag containing fish and water. Furthermore, according to a plastic transport of live fishery products wherein this carbon dioxide absorbing materials are sealed inside a transport bag, it is possible to prevent vitality deterioration and death of live fishery products and extend the transport time thereof.

In the present invention, calcium hydroxide or magnesium hydroxide is used as alkaline earth metal hydroxide. It is preferable that calcium hydroxide or magnesium hydroxide be used in powder or granular form to secure the speed of carbon dioxide absorption.

In the present invention, gas-permeable material for carbon dioxide absorbing materials using a microporous film or non-woven fabric having a Gurley method gas permeability (JIS P8117) of 0.1~3000 sec./100 ml of gas, preferably 1~1000 sec./100 ml of gas, and being impervious to water at normal pressure is used as the plastic gas-permeable material.

A microporous film is a polyolefine film possessing micropores of 0.01~50 $\mu$m in size, and is manufactured by such methods as drawing films containing foreign matters or performing electron beam irradiation to films. Furthermore, a non-woven fabric is made of long fibers which have been conjugated by performing cross distribution to a bundle of polyolefine fibers and heat pressing thereafter. Microporous films and non-woven fabrics may be used as is or by being laminated with other films to provide reinforcement or sealability.

As plastic gas-permeable material, for example, there is "NF Sheet" (manufactured by Tokuyama), "FP-2" (manufactured by Mitsubishi Chemical Corp.), "NOP" (manufactured by Nippon Petrochemical Co., Ltd.), "Cellpore NW01" (manufactured by Sekisui Chemical Co., Ltd.), "Tyvek" (manufactured by Dupont Inc.), "Eleves" (manufactured by Unitika, Ltd.), and "Luxer" (manufactured by Asahi Chemical Industry Co., Ltd.) and so on.

In the present invention, alkaline earth metal hydroxide and/or oxide is packaged with a plastic gas-permeable material having a Gurley method gas permeability (JIS P8117) of 0.1~3000 sec./100 ml of gas and being impervious to water at normal pressure, and a non gas-permeable film may be used together as a part of such packaging material.

It is preferable that the carbon dioxide absorbing materials be fixed to the headspace of the transport bag with adhesive materials or adhesive tapes upon usage. Furthermore, if the carbon dioxide absorbing materials uses a plastic gas-permeable material for the entire packaging material thereof, having a Gurley method gas permeability (JIS P8117) of 0.1~3000 sec./100 ml of gas and being impervious to water at normal pressure, it may be sealed inside the transport bag as is and be used while it is floated on the water surface.

Although there is no particular limitation on the size of the transport bag, quantity of fish to be sealed inside and amount of water, it is necessary to seal in a sufficient amount of gaseous oxygen upon anticipating the consumption of such gaseous oxygen during transport.

(Embodiment 3)

The transport system of live fishery products pertaining to Embodiment 3 comprises a structure wherein the oxygen generating materials 1 obtained in Embodiment 1 and the carbon dioxide absorbing materials 20 obtained in Embodiment 2 are, in a similar manner as Embodiment 1, sealed inside the plastic film bag which is a transport bag containing live fishery products and water.

While the present invention will hereinafter be described in detail referring to the following Examples, it will be understood that it is not intended to limit the present invention to such Examples.

EXAMPLE 1

An oxygen generating materials was obtained by filling 40 g of sodium carbonate hydrogen peroxide adduct (SPC-G; manufactured by Mitsubishi Gas Chemical Co., Inc.) and 0.4 g of powdered active carbon (Kuraraycoal PW; manufactured by Kararay Chemical Co., Ltd.) between two sheets of polyethylene non-woven fabric with a thickness of 160 $\mu$m (Tyvek; U.S.A.; manufactured by Dupont Inc.), and heat sealing the four sides such that the measurements become 120 mm in length×85 mm in width, with a sealed width of 10 mm.

One obtained oxygen generating materials was floated on water (1 liter) within a hermetically sealed glass receptacle (entire content value: approx. 2 liters) connected to a wet gas meter. The cumulative oxygen generation amount from the time of preparation was 1.5 liters after 24 hours, 3.1 liters after 72 hours and 3.5 liters after 120 hours.

EXAMPLE 2

Similar procedures were taken as Example 1, except that one sheet of polyethylene non-woven fabric with a thickness of 160 $\mu$m and one sheet of laminated film made by dry laminating holeless polyethylene film and polyethylene terephthalate film were used instead of two sheets of polyethylene non-woven fabric with a thickness of 160 $\mu$m.

The cumulative oxygen generation amount from the time of preparation was 1.1 liters after 24 hours, 2.4 liters after 72 hours and 3.5 liters after 120 hours.

EXAMPLE 3

Similar procedures were taken as Example 1, except that two sheets of packaging material made by heat fusing three layers, namely polypropylene microporous film with a thickness of 50 $\mu$m (Juraguard; U.S.A.; manufactured by Celanese Corp.), polyethylene reinforcing material (Nisseki Warif; manufactured by Nippon Petrochemical Co., Ltd.), and polyethylene film possessing small pores having a 0.3 mm diameter in 7 mm intervals in each direction of left, right, up and down, were used instead of two sheets of polyethylene non-woven fabric with a thickness of 160 $\mu$m. However, heat sealing was performed such that the porous sheet layer would be on the inner side of the package.

The cumulative oxygen generation amount from the time of preparation was 0.7 liters after 24 hours, 2.0 liters after 72 hours and 3.2 liters after 120 hours.

EXAMPLE 4

Figure 4:
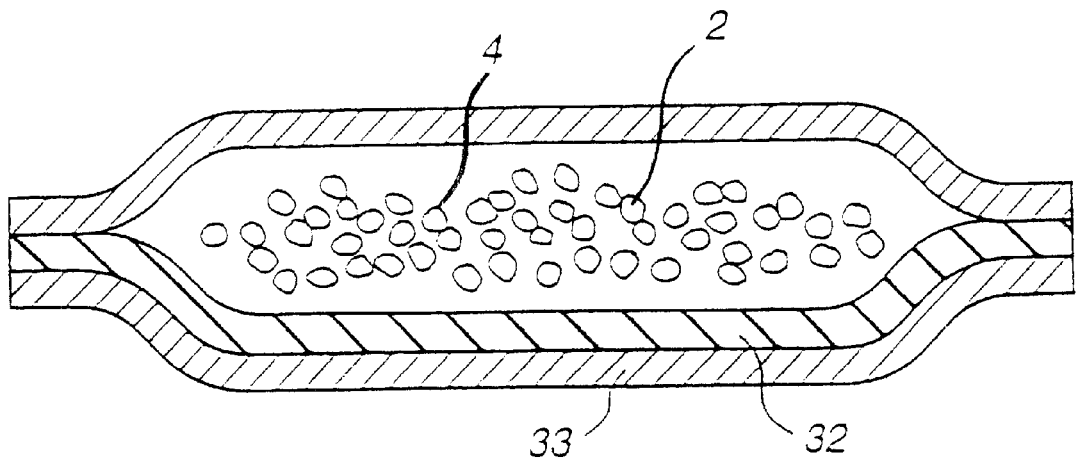
FIG. 4 is a sectional view of an oxygen generating materials pertaining to Example 4 of the present invention.

Similar procedures were taken as Example 1, except that one sheet of laminated packaging material made by laminating an EVA film with a thickness of 40 $\mu$m and possessing small pores having a 0.2 mm diameter in 1 mm intervals in each direction of left, right, up and down, and a multi-microporous film with a thickness of 150 $\mu$m (Cellpore; manufactured by Sekisui Chemical Co., Ltd.) and one sheet of polyethylene non-woven fabric with a thickness of 160 $\mu$m were used instead of two sheets of polyethylene non-woven fabric with a thickness of 160 $\mu$m shown in FIG. 4. However, heat sealing was performed such that the EVA layer would be on the inner side of the package.

The cumulative oxygen generation amount from the time of preparation was 1.2 liters after 24 hours, 2.7 liters after 72 hours and 3.5 liters after 120 hours.

EXAMPLE 5

Similar procedures were taken as Example 1, except that 40 g of sodium carbonate hydrogen peroxide adduct (SPC-D; manufactured by Mitsubishi Gas Chemical Co., Inc.) was used instead of 40 g of sodium carbonate hydrogen peroxide adduct (SPC-G; manufactured by Mitsubishi Gas Chemical Co., Inc.).

The cumulative oxygen generation amount from the time of preparation was 0.6 liters after 24 hours, 1.4 liters after 72 hours and 2.2 liters after 120 hours.

EXAMPLE 6

Similar procedures were taken as Example 1, except that 40 g of sodium perborate mono-hydrate (15% Perbon; manufactured by Mitsubishi Gas Chemical Co., Inc.) was used instead of 40 g of sodium carbonate hydrogen peroxide adduct (SPC-G; manufactured by Mitsubishi Gas Chemical Co., Inc.).

The cumulative oxygen generation amount from the time of preparation was 0.4 liters after 24 hours, 1.5 liters after 72 hours and 2.3 liters after 120 hours.

EXAMPLE 7

Similar procedures were taken as Example 1, except that 2.0 g of manganese dioxide (rematerials manufactured by Aldrich) was used instead of 0.4 g of powdered active carbon.

The cumulative oxygen generation amount from the time of preparation was 1.4 liters after 24 hours, 2.9 liters after 72 hours and 3.4 liters after 120 hours.

EXAMPLE 8

Similar procedures were taken as Example 1, except that 0.2 g of catalase solution (Asc Super 25; manufactured by Mitsubishi Gas Chemical Co., Inc.) was used instead of 0.4 g of powdered active carbon.

The cumulative oxygen generation amount from the time of preparation was 1.0 liters after 24 hours, 2.1 liters after 72 hours and 2.8 liters after 120 hours. Moreover, hydrogen peroxide was not detected in the water.

COMPARATIVE EXAMPLE 1

Similar procedures were taken as Example 1, except that two sheets of laminated film made by dry laminating holeless polyethylene film and polyethylene terephthalate film were used instead of two sheets of polyethylene non-woven fabric with a thickness of 160 μm.

No gaseous oxygen was generated even after 120 hours had lapsed from the time of preparation.

COMPARATIVE EXAMPLE 2

Similar procedures were taken as Example 1, except that 40 g of 10% hydrogen peroxide aqueous solution was used instead of 40 g of sodium carbonate hydrogen peroxide adduct.

Two point five liters of gaseous oxygen was generated in 30 min. from the time of preparation, but no gaseous oxygen was generated thereafter.

COMPARATIVE EXAMPLE 3

Similar procedures were taken as Example 1, except that powdered active carbon was not used.

The cumulative oxygen generation amount from the time of preparation was 0.0 liters after 24 hours, 0.1 liters after 72 hours and 0.3 liters after 120 hours.

EXAMPLE 9

Seventy goldfish (total weight of 650 g), 3 liters of water and three oxygen generating materials prepared with the method of Example 1 were put into a polyethylene bag, approx. 5 liters of gaseous oxygen was blown therein, the mouth of the bag was fastened with a rubber band, and was left alone at a temperature of 25° C. All of the goldfish were alive at the time 48 hours had lapsed and 54 goldfish were alive at the time 72 hours had lapsed.

COMPARATIVE EXAMPLE 4

Similar procedures were taken as Example 9, except that the oxygen generating materials was not used. All of the goldfish had died at the time 48 hours had lapsed.

EXAMPLE 10

An oxygen generating materials was obtained by filling 40 g of sodium carbonate hydrogen peroxide adduct (SPC-G; manufactured by Mitsubishi Gas Chemical Co., Inc.) and 0.4 g of powdered active carbon having a average particle size of 150~300 μm (obtained by pulverizing and sieving Kuraraycoal PW; manufactured by Kuraray Chemical Co., Ltd.) between two sheets of polyethylene non-woven fabric with a thickness of 160 μm (Tyvek; U.S.A.; manufactured by Dupont Inc.), and heat sealing the four sides such that the measurements become 120 mm in length×85 mm in width, with a sealed width of 10 mm. One obtained oxygen generating materials was floated on water (1 liter) within a hermetically sealed glass receptacle (entire content value: approx. 2 liters) connected to a wet gas meter. The cumulative oxygen generation amount from the time of preparation was 0.6 liters after 24 hours, 3.0 liters after 72 hours and 3.5 liters after 120 hours.

EXAMPLE 11

Similar procedures were taken as Example 10, except that active carbon having a average particle size of 75~150 μm was used instead of active carbon having a average particle size of 150~300 μm. The cumulative oxygen generation amount from the time of preparation was 0.9 liters after 24 hours, 3.2 liters after 72 hours and 3.5 liters after 120 hours.

EXAMPLE 12

Similar procedures were taken as Example 10, except that active carbon having a average particle size of 45~75 μm was used instead of active carbon having a average particle size of 150~300 μm. The cumulative oxygen generation amount from the time of preparation was 1.7 liters after 24 hours, 3.4 liters after 72 hours and 3.5 liters after 120 hours.

EXAMPLE 13

Similar procedures were taken as Example 10, except that catalyst active carbon having a average particle size of 300~600 μm (obtained by pulverizing and sieving granular CENTAUR; manufactured by Calgon Far East Co., Ltd.) was used instead of active carbon having a average particle size of 150~300 μm (obtained by pulverizing and sieving Kuraraycoal PW; manufactured by Kuraray Chemical Co., Ltd.). The cumulative oxygen generation amount from the time of preparation was 0.3 liters after 24 hours, 2.8 liters after 72 hours and 3.5 liters after 120 hours.

EXAMPLE 14

Similar procedures were taken as Example 1, except that one sheet of polyethylene non-woven fabric with a thickness of 160 μm and one sheet of laminated film made by dry laminating holeless polyethylene film and polyethylene terephthalate film were used instead of two sheets of polyethylene non-woven fabric with a thickness of 160 μm. The cumulative oxygen generation amount from the time of preparation was 0.6 liters after 24 hours 2.6 liters after 72 hours and 3.5 liters after 120 hours.

EXAMPLE 15

Similar procedures were taken as Example 10, except that one sheet of packaging material made by heat fusing three layers, namely polypropylene multi-microporous film with a thickness of 50 μm (Juraguard; U.S.A.; manufactured by Celanese Corp.), polyethylene reinforcing material (Nisseki Warif; manufactured by Nippon Petrochemical Co., Ltd.), and polyethylene film possessing small pores having a 0.3 mm diameter in 7 mm intervals in each direction of left, right, up and down, and one sheet of laminated packaging material made by laminating an EVA film with a thickness of 40 μm and possessing small pores having a 0.2 mm diameter in 1 mm intervals in each direction of left, right, up and down, and a multi-microporous film with a thickness of microporous 150 μm (Cellpore; manufactured by Sekisui Chemical Co., Ltd.) were used instead of two sheets of polyethylene non-woven fabric with a thickness of 160 μm. However, heat sealing was performed such that the porous sheet layer would be on the inner side of the package. The cumulative oxygen generation amount from the time of preparation was 0.5 liters after 24 hours, 2.2 liters after 72 hours and 3.5 liters after 120 hours.

EXAMPLE 16

Similar procedures were taken as Example 1, except that 40 g of sodium carbonate hydrogen peroxide adduct (SPC-D; manufactured by Mitsubishi Gas Chemical Co., Inc.) and 0.8 g of active carbon with a particle diameter of 45~75 μm were used instead of 40 g of sodium carbonate hydrogen peroxide adduct (SPC-G; manufactured by Mitsubishi Gas Chemical Co., Inc.) and 0.4 g of active carbon with a average particle size of 150~300 μm. The cumulative oxygen generation amount from the time of preparation was 0.9 liters after 24 hours, 2.1 liters after 72 hours and 3.3 liters after 120 hours.

COMPARATIVE EXAMPLE 5

Similar procedures were taken as Example 10, except that powdered active carbon was not used. The cumulative oxygen generation amount from the time of preparation was 0.0 liters after 24 hours, 0.1 liters after 72 hours and 0.3 liters after 120 hours.

COMPARATIVE EXAMPLE 6

Similar procedures were taken as Example 10, except that active carbon with a average particle size of more than 5000 μm was used instead of active carbon with a average particle size of 150~300 μm. The gaseous oxygen generation amount was 0.1 liters even after 120 hours had lapsed from the time of preparation.

COMPARATIVE EXAMPLE 7

Similar procedures were taken as Example 10, except that two sheets of laminated film made by dry laminating hole-less polyethylene film and polyethylene terephthalate film were used instead of two sheets of polyethylene non-woven fabric with a thickness of 160 μm. No gaseous oxygen was generated even after 120 hours had lapsed from the time of preparation.

COMPARATIVE EXAMPLE 8

Similar procedures were taken as Example 10, except that 40 g of 10% hydrogen peroxide aqueous solution was used instead of 40 g of sodium carbonate hydrogen peroxide adduct. Two point five liters of gaseous oxygen was generated in 30 min. from the time of preparation, but no gaseous oxygen was generated thereafter.

EXAMPLE 17

Seventy goldfish (total weight of 650 g), 3 liters of water and three oxygen generating materials prepared with the method of Example 10 were put into a polyethylene bag, approx. 5 liters of gaseous oxygen was blown therein, the mouth of the bag was fastened with a rubber band, and was left alone at a temperature of 25° C. All of the goldfish were alive at the time 48 hours had lapsed and 55 goldfish were alive at the time 72 hours had lapsed.

COMPARATIVE EXAMPLE 9

Similar procedures were taken as Example 17, except that the oxygen generating materials was not used. All of the goldfish had died at the time 48 hours had lapsed.

EXAMPLE 18

A carbon dioxide absorbing materials was prepared by manufacturing a small bag of 8 cm×10 cm wherein one side is Tyvek (manufactured by Dupont Inc.; a non-woven fabric having a Gurley method gas permeability (JIS P8117) of 30 sec./100 ml of gas and being impervious to water at normal pressure) and the other side is a non gas-permeable film made from polyethylene terephthalate, polyethylene and ethylene vinyl acetate copolymer, and sealing 11 g of powdered calcium hydroxide inside this small bag. Approximately 10 kg of live eel (30 eels; provision of feed was ceased) and approx. 1 liter of ice water were put into a 55 cm×85 cm polyethylene bag, a carbon dioxide absorbing materials was fixed to the headspace inside the bag with double-faced adhesive tape, the bag was inflated by being filled with gaseous oxygen and sealed hermetically with a rubber band. The volume of the headspace at such time was approx. 10 liters. The hermetically sealed bag was put into a corrugated cardboard box, preserved at 25° C., and the carbon dioxide concentration of the headspace and the number of deaths of eels were observed 24 hours later and 42 hours later. The results thereof are shown in Table 1.

COMPARATIVE EXAMPLE 10

A similar test as Example 18 was performed except that the carbon dioxide absorbing materials was not used. The results thereof are shown in Table 1.

TABLE 1

| Preservation Time | | Example 18 | Comparative Example 10 |
|---|---|---|---|
| 24 Hours | Carbon Dioxide Concentration (%) | 0.9 | 5.8 |
| | Number of Deaths (of Eels) | 0 | 0 |
| 42 Hours | Carbon Dioxide Concentration (%) | 8.8 | 16.6 |
| | Number of Deaths (of Eels) | 0 | 23 |

EXAMPLE 19

Fifty-five grams of powdered magnesium hydroxide was sealed inside a small bag of 10 cm×15 cm formed from a packaging material (microporous film having a Gurley method gas permeability (JIS P8117) of 100 sec./100 ml of gas and being impervious to water at normal pressure) made by laminating an NF Sheet (manufactured by Tokuyama Corp.) and polyethylene porous film, and the result thereof was used as a carbon dioxide absorbing materials.

Approximately 2.5 kg of goldfish (250 Japanese goldfish; provision of feed was ceased) and 12 liters of water were put into a 55 cm×96 cm polyethylene bag, and a carbon dioxide absorbing materials was sealed inside and floated on the water surface. Thereafter, the bag was inflated by being filled with gaseous oxygen and sealed hermetically with a rubber band. The volume of the headspace at such time was approx. 20 liters. The hermetically sealed bag was put into a corrugated cardboard box, preserved at 25° C., and the carbon dioxide concentration of the headspace and the number of deaths of goldfish were observed 24 hours later, 48 hours later and 72 hours later to examine the condition (vitality) of living goldfish. The results thereof are shown in Table 2.

COMPARATIVE EXAMPLE 11

A similar test as Example 19 was performed except that the carbon dioxide absorbing materials was not used. The results thereof are shown in Table 2.

TABLE 2

| Preservation Time | | Example 19 | Comparative Example 11 |
|---|---|---|---|
| 24 Hours | Carbon Dioxide Concentration (%) | 1.3 | 7.2 |
| | Number of Deaths (of Goldfish) | 0 | 0 |
| | Condition of Living Goldfish | ○ | × |
| 48 Hours | Carbon Dioxide Concentration (%) | 2.7 | 13.1 |
| | Number of Deaths (of Goldfish) | 0 | 0 |
| | Condition of Living Goldfish | ○ | × |
| 72 Hours | Carbon Dioxide Concentration (%) | 6.9 | 20.4 |
| | Number of Deaths (of Goldfish) | 0 | 12 |
| | Condition of Living Goldfish | ○ | × |

Note:
Regarding the condition of living goldfish:
○ means that the goldfish are active and moving its mouths near the water surface; and
× means that the movements of the goldfish are dull and its mouths are not moving near the water surface.

EXAMPLE 20

An oxygen generating materials was obtained by filling 40 g of sodium carbonate hydrogen peroxide adduct (SPC-G; manufactured by Mitsubishi Gas Chemical Co., Inc.) and 0.4 g of powdered active carbon (Kuraraycoal PW; manufactured by Kuraray Chemical Co., Ltd.) between two sheets of packaging material made by heat fusing three layers, namely polypropylene multi-microporous film with a thickness of 50 $\mu$m (Juraguard; U.S.A.; manufactured by Celanese Corp.), polyethylene reinforcing material (Nisseki Warif; manufactured by Nippon Petrochemical Co., Ltd.), and polyethylene film possessing small pores having a 0.3 mm diameter in 7 mm intervals in each direction of left, right, up and down, and heat sealing the four sides such that the measurements become 120 mm in length×85 mm in width, with a sealed width of 10 mm. However, heat sealing was performed such that the porous sheet layer would be on the inner side of the package.

Furthermore, a carbon dioxide absorbing materials was obtained by filling 30 g of granular calcium hydroxide between one sheet of polyethylene non-woven fabric with a thickness of 160 $\mu$m (Tyvek; U.S.A.; manufactured by Dupont Inc.) and one sheet of laminated film made by dry laminating holeless polyethylene film and polyethylene terephthalate film, and heat sealing the four sides such that the measurements become 120 mm in length×85 mm in width, with a sealed width of 10 mm.

Seventy goldfish (total weight of 650 g), 3 liters of water, and three oxygen generating materials and two carbon dioxide absorbing materials prepared above were put into a polyethylene bag, approx. 5 liters of gaseous oxygen was blown therein, the mouth of the bag was fastened with a rubber band, and was left alone at a temperature of 25° C. At the time 120 hours had lapsed, the oxygen concentration in the headspace was over 70% and the carbon dioxide concentration was preserved below 10%, and all of the goldfish were alive.

COMPARATIVE EXAMPLE 12

Seventy goldfish (total weight of 650 g) and 3 liters of water were put into a polyethylene bag, approx. 5 liters of gaseous oxygen was blown therein, the mouth of the bag was fastened with a rubber band, and was left alone at a temperature of 25° C. At the time 48 hours had lapsed, the oxygen concentration in the headspace was 24% and the carbon dioxide concentration was 29%, and all of the goldfish had died.

COMPARATIVE EXAMPLE 13

Seventy goldfish (total weight of 650 g), 3 liters of water and three oxygen generating materials prepared with the method of Example 20 were put into a polyethylene bag, approx. 5 liters of gaseous oxygen was blown therein, the mouth of the bag was fastened with a rubber band, and was left alone at a temperature of 25° C. At the time 48 hours had lapsed, the oxygen concentration in the headspace was 77% and the carbon dioxide concentration was 20%, and 70 goldfish were alive. At the time 72 hours had lapsed, the oxygen concentration in the headspace was 74% and the carbon dioxide concentration was 20%, and 53 goldfish were alive. At the time 120 hours had lapsed, the oxygen concentration in the headspace was 72% and the carbon dioxide concentration was 20%, and none of the goldfish were alive.

COMPARATIVE EXAMPLE 14

Seventy goldfish (total weight of 650 g), 3 liters of water and two carbon dioxide absorbing materials prepared with the method of Example 20 were put into a polyethylene bag, approx. 5 liters of gaseous oxygen was blown therein, the mouth of the bag was fastened with a rubber band, and was left alone at a temperature of 25° C. At the time 48 hours had lapsed, the oxygen concentration in the headspace was 25% and the carbon dioxide concentration was 6%, and 58 goldfish were alive. At the time 72 hours had lapsed, the oxygen concentration in the headspace was 20% and the carbon dioxide concentration was 7%, and none of the goldfish were alive.

EXAMPLE 21

An oxygen generating materials package was obtained by filling 40 g of sodium carbonate hydrogen peroxide adduct (SPC-G; manufactured by Mitsubishi Gas Chemical Co., Inc.) and 0.4 g of powdered active carbon (Kuraraycoal PW; manufactured by Kuraray Chemical Co., Ltd.) between two sheets of packaging material made by heat fusing three layers, namely polypropylene multi-microporous film with a thickness of 50 $\mu$m (Juraguard; U.S.A.; manufactured by Celanese Corp.), polyethylene reinforcing material (Nisseki Warif; manufactured by Nippon Petrochemical Co., Ltd.), and polyethylene film possessing small pores having a 0.3 mm diameter in 7 mm intervals in each direction of left, right, up and down, and heat sealing the four sides such that the measurements become 120 mm in length×85 mm in width, with a sealed width of 10 mm. However, heat sealing was performed such that the porous sheet layer would be on the inner side of the package.

Furthermore, a carbon dioxide absorbing materials package was obtained by filling 40 g of granular calcium hydroxide between one sheet of polyethylene non-woven fabric with a thickness of 160 $\mu$m (Tyvek; U.S.A.; manufactured by Dupont Inc.) and one sheet of laminated film made by dry laminating holeless polyethylene film and polyethylene terephthalate film, and heat sealing the four sides such that the measurements become 120 mm in length×85 mm in width, with a sealed width of 10 mm.

Moreover, an oxygen generating materials/carbon dioxide absorbing materials package was obtained by placing four oxygen generating materials packages and two carbon dioxide absorbing materials packages between two sheets of hydrophobic non-woven fabric, which is hydrophobic material, with a thickness of 90 $\mu$m (Melfit I; manufactured by Unisel, Ltd.), and heat sealing the four sides such that the measurements become 200 mm in length×150 mm in width, with a sealed width of 10 mm.

One Hundred and Fifty goldfish (total weight: approx. 1 kg), 10 liters of water and the prepared oxygen generating materials/carbon dioxide absorbing materials package were put into a polyethylene bag, approx. 20 liters of gaseous oxygen was blown therein, the mouth of the bag was fastened with a rubber band, and was left alone at a temperature of 25° C. At the time 72 hours had lapsed, the oxygen concentration in the headspace was 87% and the carbon dioxide concentration was 11%. At the time 96 hours had lapsed, the oxygen concentration in the headspace was 80% and the carbon dioxide concentration was 14%, and all of the goldfish were alive. Furthermore, the oxygen generating materials/carbon dioxide absorbing materials package was floating while roughly half of such package was submerged in water.

EXAMPLE 22

Similar procedures were taken as Example 21, except that a hydrophilic non-woven fabric with a thickness of 90 $\mu$m (Melfit-II; manufactured by Unisel, Ltd.) was used instead of a hydrophobic non-woven fabric as the hydrophobic material. At the time 72 hours had lapsed, the oxygen concentration in the headspace was 84% and the carbon dioxide concentration was 15%, and all of the goldfish were alive. At the time 96 hours had lapsed, the oxygen concentration in the headspace was 77% and the carbon dioxide concentration was 18%, and approx. 90% of the goldfish were alive. Furthermore, the oxygen generating materials/carbon dioxide absorbing materials package was floating while roughly half of such package was submerged in water.

EXAMPLE 23

Similar procedures were taken as Example 21, except that 300 goldfish (total weight: approx. 2 kg) were used instead of 150 goldfish. At the time 48 hours had lapsed, the oxygen concentration in the headspace was 84% and the carbon dioxide concentration was 13%. At the time 72 hours had lapsed, the oxygen concentration in the headspace was 82% and the carbon dioxide concentration was 17%, and all of the goldfish were alive. Furthermore, the oxygen generating materials/carbon dioxide absorbing materials package was floating while roughly half of such package was submerged in water.

COMPARATIVE EXAMPLE 15

One Hundred and Fifty goldfish (total weight: approx. 1 kg), 10 liters of water, and four oxygen generating materials packages and two carbon dioxide absorbing materials packages prepared with the method of Example 21 were put into a polyethylene bag, approx. 20 liters of gaseous oxygen was blown therein, the mouth of the bag was fastened with a rubber band, and was left alone at a temperature of 25° C. At the time 72 hours had lapsed, the oxygen concentration in the headspace was 80% and the carbon dioxide concentration was 18%, and all of the goldfish were alive. At the time 96 hours had lapsed, the oxygen concentration in the headspace was 73% and the carbon dioxide concentration was 22%, and approx. 70% of the goldfish had died. Furthermore, the oxygen generating materials package and carbon dioxide absorbing materials package were floating while roughly 30% and 90% of such packages were submerged in water, respectively.

EXAMPLE 24

An oxygen generating materials package was obtained by filling 40 g of sodium carbonate hydrogen peroxide adduct (SPC-G; manufactured by Mitsubishi Gas Chemical Co., Inc.), 2.0 g of manganese dioxide (rematerials manufactured by Aldrich) and 2.0 g of activated alumina between two sheets of packaging material made by heat fusing three layers, namely polypropylene multi-microporous film with a thickness of 50 $\mu$m (Juraguard; U.S.A.; manufactured by Celanese Corp.), polyethylene reinforcing material (Nisseki Warif; manufactured by Nippon Petrochemical Co., Ltd.), and polyethylene film possessing small pores having a 0.3 mm diameter in 7 mm intervals in each direction of left, right, up and down, and heat sealing the four sides such that the measurements become 120 mm in length×85 mm in width, with a sealed width of 10 mm. However, heat sealing was performed such that the porous sheet layer would be on the inner side of the package.

Furthermore, a carbon dioxide absorbing materials package was obtained by filling 40 g of granular calcium hydroxide between one sheet of polyethylene non-woven fabric with a thickness of 160 $\mu$m (Tyvek; U.S.A.; manufactured by Dupont Inc.) and one sheet of laminated film made by dry laminating holeless polyethylene film and polyethylene terephthalate film, and heat sealing the four sides such that the measurements become 120 mm in length×85 mm in width, with a sealed width of 10 mm. Moreover, an oxygen generating materials/carbon dioxide absorbing materials package was obtained by placing four oxygen generating materials packages and two carbon dioxide absorbing materials packages prepared above between two sheets of hydrophobic non-woven fabric, which is hydrophobic material, with a thickness of 90 $\mu$m (Melfit I; manufactured by Unisel, Ltd.), and heat sealing the four sides such that the measurements become 200 mm in length×150 mm in width, with a sealed width of 10 mm.

Ten obtained oxygen generating materials/carbon dioxide absorbing materials packages were interposed between two sheets of layered film (cup method moisture permeability of 1 $g/m^2/24$ hr) made by laminating aluminum vaporization polyester film and polyethylene film and the four sides thereof were heat sealed. This oxygen generating materials/carbon dioxide absorbing materials package was hermetically sealed inside an outer bag, and such outer bag was preserved for two (2) months at 30° C. within a thermo-hygrostat with a relative humidity of 80%, but no inflation of the outer bag could be confirmed.

One oxygen generating materials/carbon dioxide absorbing materials package after such preservation was floated on water (1 liter) within a hermetically sealed glass receptacle (entire content volume: approx. 2 liters) connected to a wet gas meter. The cumulative oxygen generation amount from the time of preparation was 1.3 liters after 24 hours, 2.8 liters after 72 hours and 3.4 liters after 120 hours.

COMPARATIVE EXAMPLE 16

Similar procedures were taken as Example 24, except that activated alumina was not filled inside the oxygen generating materials package or carbon dioxide absorbing materials package. Thereafter, an oxygen generating materials/carbon dioxide absorbing materials package was prepared and placed inside a hermetically sealed outer bag. This outer bag containing the oxygen generating materials/carbon dioxide absorbing materials package was preserved for two (2) weeks at 30° C. within a thermo-hygrostat with a relative humidity of 80%, and the outer bag inflated and burst in two (2) weeks.

EXAMPLE 25

An oxygen generating materials package was obtained by filling 40 g of sodium carbonate hydrogen peroxide adduct (SPC-G; manufactured by Mitsubishi Gas Chemical Co., Inc.), 0.4 g of active carbon having a particle diameter of 150~300 $\mu$m (obtained by pulverizing and sieving a granular active carbon Kuraraycoal PW; manufactured by Kuraray Chemical Co., Ltd.), and 4.0 g of silica gel between two sheets of polyethylene non-woven fabric with a thickness of 160 $\mu$m (Tyvek; U.S.A.; manufactured by Dupont Inc.), and heat sealing the four sides such that the measurements become 120 mm in length×85 mm in width, with a sealed width of 10 mm. Furthermore, a carbon dioxide absorbing materials was obtained with a similar method as Example 24, except that 4.0 g of silica gel was used instead of 2.0 g of active alumina.

An oxygen generating materials/carbon dioxide absorbing materials package was obtained by packaging four oxygen generating materials packages and two carbon dioxide absorbing materials packages prepared above with a hydrophobic non-woven fabric in a similar manner as Example 24. Two obtained oxygen generating materials/carbon dioxide absorbing materials packages were interposed between two sheets of laminated film (cup method moisture permeability of 4 g/m$^2$/24 hr) made by laminating polyvinylidene chloride coated drawn nylon film and polyethylene film, and the four sides thereof were heat sealed. A pinhole having a diameter of 0.2 mm was provided at one point on an outer bag containing this oxygen generating materials/carbon dioxide absorbing materials package, and such outer bag was preserved for two (2) months at 30° C. within a thermo-hygrostat with a relative humidity of 80%, and the percentage of available oxygen remaining in the peroxide was 95%.

One oxygen generating materials/carbon dioxide absorbing materials package after such preservation was floated on water (1 liter) within a hermetically sealed glass receptacle (entire content volume: approx. 2 liters) connected to a wet gas meter. The cumulative oxygen generation amount from the time of preparation was 0.5 liters after 24 hours, 2.9 liters after 72 hours and 3.5 liters after 120 hours.

COMPARATIVE EXAMPLE 17

Similar procedures were taken as Example 25, except that silica gel was not filled inside the oxygen generating materials package or carbon dioxide absorbing materials package. The outer bag containing the oxygen generating materials/carbon dioxide absorbing materials package was preserved for two (2) months at 30° C. within a thermo-hygrostat with a relative humidity of 80%, and the percentage of available oxygen remaining in the peroxide was 74%. Furthermore, the cumulative oxygen generation amount was 0.4 liters after 24 hours, 1.5 liters after 72 hours and 2.4 liters after 120 hours.

EXAMPLE 26

Similar procedures were taken as Example 25, except that 0.2 g of catalase solution (ASC Super 25; manufactured by Mitsubishi Gas Chemical Co., Inc.) and 1.0 g of bone-dry permutite were used instead of 0.4 g of active carbon and 4.0 g of silica gel. Furthermore, a carbon dioxide absorbing materials was obtained with a similar method as Example 25, except that 1.0 g of bone-dry permutite was used instead of 2 g of activated alumina.

The percentage of available oxygen remaining in the peroxide after preservation was 92%. Furthermore, the cumulative oxygen generation amount was 0.9 liters after 24 hours, 2.0 liters after 72 hours and 2.8 liters after 120 hours.

COMPARATIVE EXAMPLE 18

Similar procedures were taken as Example 26, except that permutite was not filled inside the oxygen generating materials package or carbon dioxide absorbing materials package. The outer bag containing the oxygen generating materials/carbon dioxide absorbing materials package was preserved for two (2) months at 30° C. within a thermo-hygrostat with a relative humidity of 80%, and the percentage of available oxygen remaining in the peroxide was 59%. Furthermore, the cumulative oxygen generation amount was 0.6 liters after 24 hours, 1.2 liters after 72 hours and 1.5 liters after 120 hours.

EXAMPLE 27

An oxygen generating materials/carbon dioxide absorbing materials package was obtained with a similar method as Example 25, except that silica gel was not filled inside the carbon dioxide absorbing materials package. Two obtained oxygen generating materials/carbon dioxide absorbing materials packages and 40 g of silica gel were interposed between two sheets of laminated film (cup method moisture permeability of 1 g/m$^2$/24 hr) made by laminating aluminum vaporization polyester film and polyethylene film, and the four sides thereof were heat sealed. A pinhole having a diameter of 0.2 mm was provided at one point on an outer bag containing this oxygen generating materials/carbon dioxide absorbing materials package, and such outer bag was preserved for two (2) months at 30° C. within a thermo-hygrostat with a relative humidity of 80%, and the percentage of available oxygen remaining in the peroxide was 93%.

One Hundred and Fifty goldfish (total weight: approx. 1 kg), 10 liters of water, and one such preserved oxygen generating materials/carbon dioxide absorbing materials package were put into a polyethylene bag, 20 liters of gaseous oxygen was blown therein, the mouth of the bag was fastened with a rubber band, and was left alone at a temperature of 25° C. At the time 72 hours had lapsed, the oxygen concentration in the headspace was 86% and the carbon dioxide concentration was 11%. At the time 96 hours had lapsed, the oxygen concentration in the headspace was 79% and the carbon dioxide concentration was 14%, and all of the goldfish were alive.

COMPARATIVE EXAMPLE 19

An oxygen generating materials/carbon dioxide absorbing materials package was obtained with a similar method as Example 27, except that silica gel was not filled inside the oxygen generating materials package. Two obtained oxygen generating materials/carbon dioxide absorbing materials packages and 56 g of silica gel were placed inside an outer bag possessing a pinhole, and such outer bag was preserved for two (2) months at 30° C. within a thermo-hygrostat with a relative humidity of 80%, and the percentage of available oxygen remaining in the peroxide was 64%.

One Hundred and Fifty goldfish (total weight: approx. 1 kg), 10 liters of water, and one such preserved oxygen generating materials/carbon dioxide absorbing materials package were put into a polyethylene bag, approx. 20 liters of gaseous oxygen was blown therein, the mouth of the bag was fastened with a rubber band, and was left alone at a temperature of 25° C. At the time 72 hours had lapsed, the oxygen concentration in the headspace was 83% and the carbon dioxide concentration was 12%. At the time 96 hours had lapsed, the oxygen concentration in the headspace was 73% and the carbon dioxide concentration was 15%, and 10% of the goldfish had died.

As explained above, according to the present invention, the survival rate of live fishery products during plastic transport or preservation thereof may be increased. Furthermore, the present invention may also be preferably employed upon emergencies such as the condition of hypoxia or the generation of harmful gases, or as a freshness preservation materials for plants and the like.

Moreover, according the method of the present invention, vitality deterioration of live fishery products may be prevented and the survival rate thereof during transport may be increased, in a simple manner, without making any drastic changes in the conventional plastic transport method. Furthermore, plastic transport of live fishery products to distant places, which was impossible heretofore, is made possible as the transport time is extended as a result thereof.

What is claimed is:

1. A transport system of live fishery products wherein oxygen generating materials, carbon dioxide absorbing materials, and live fishery products are sealed inside a transport bag, said oxygen generating materials being prepared by packaging sodium carbonate hydrogen peroxide adduct and active carbon of which the average particle size is 25–5000 $\mu$m with a moisture-permeable material having a cup method moisture permeability (40° C., 90% RH) of more than 20 g/m$^2$/24 h and being impervious to water at atmospheric pressure, and said carbon dioxide absorbing materials being prepared by packaging alkaline earth metal hydroxide with a plastic gas-permeable material having a Gurley method gas permeability of 0.1~3000 sec./100 ml of gas and being impervious to water at atmospheric pressure.

2. The transport system of live fishery products defined in claim 1, wherein the transport bag is made from a material that permeates water at atmospheric pressure.

* * * * *